United States Patent
Lewis et al.

(10) Patent No.: US 6,694,090 B1
(45) Date of Patent: Feb. 17, 2004

(54) METHOD AND APPARATUS FOR DYNAMICALLY OVERRIDING A RATINGS LIMIT DURING PLAYBACK OF A DIGITAL PROGRAM

(75) Inventors: Debbie Indira Lewis, Norcross, GA (US); Pratish Ratilal Desai, Fremont, CA (US); Robert Howard Miller, Leawood, KS (US)

(73) Assignee: Thomson Licensing S.A., Boulogne (FR)

( * ) Notice: Subject to any disclaimer, the term of this patent is extended or adjusted under 35 U.S.C. 154(b) by 0 days.

(21) Appl. No.: 09/223,935

(22) Filed: Dec. 31, 1998

Related U.S. Application Data
(60) Provisional application No. 60/093,356, filed on Jul. 20, 1998.

(51) Int. Cl.[7] .................... H04N 5/91; H04N 5/90; H04N 5/85; H04N 5/781; G11B 19/04
(52) U.S. Cl. .................. 386/94; 386/125; 360/60
(58) Field of Search .................... 386/1, 94, 69–70, 386/125–126; 360/60; 348/553, 558, 563, 570, 906

(56) References Cited

U.S. PATENT DOCUMENTS

| | | | | |
|---|---|---|---|---|
| 4,930,158 A | * | 5/1990 | Vogel | 380/5 |
| 5,434,678 A | * | 7/1995 | Abecassis | 386/52 |
| 5,497,241 A | * | 3/1996 | Ostrover et al. | 386/94 |
| 5,574,567 A | * | 11/1996 | Cookson et al. | 386/46 |
| 5,589,945 A | * | 12/1996 | Abecassis | 386/83 |
| 5,684,918 A | * | 11/1997 | Abecassis | 348/14.01 |
| 5,691,972 A | * | 11/1997 | Tsuga et al. | 369/275.3 |
| 5,828,402 A | * | 10/1998 | Collings | 348/5.5 |
| 5,915,067 A | * | 6/1999 | Nonomura et al. | 386/70 |
| 5,933,569 A | * | 8/1999 | Sawabe et al. | 386/94 |
| 6,122,434 A | * | 9/2000 | Sawabe et al. | 386/94 |
| 6,289,165 B1 | * | 9/2001 | Abecassis | 386/46 |
| 6,519,412 B1 | * | 2/2003 | Kim | 386/94 |

FOREIGN PATENT DOCUMENTS

EP 0795873 9/1997

OTHER PUBLICATIONS

Patent Abstracts of Japan, vol. 1996, No. 12, Dec. 26, 1996, & JP 08 203246 of Aug. 8, 1996.
Patent Abstracts of Japan, vol. 1998, No. 08 & JP 069755 of Mar. 10, 1998–equivalent US Pat. 5,813,010 enclosed.
Research Disclosure No. 335, Mar. 1, 1992, p. 193.

* cited by examiner

*Primary Examiner*—Thai Tran
*Assistant Examiner*—Polin Chieu
(74) *Attorney, Agent, or Firm*—Joseph S. Tripoli; Paul P. Kiel

(57) ABSTRACT

A method and apparatus for processing information stored on a storage medium involves accessing information stored on the medium during a play mode of operation, i.e., during playback, and processing the information during playback to determine whether a rating of a portion of the program being played back differs from a rating limit set for the apparatus. If a rating other than the rating limit is detected, a user is prompted to decide whether to override the rating limit for the portion of the program. Selection of override is followed by changing the rating limit to a new rating limit needed to permit playback of the portion of the program. Override may be conditioned upon the user first entering a password. Completion of playback of the portion of the program may be followed by return of the rating limit to the rating limit set for the apparatus prior to the override operation. The override "on-the-fly" mode of operation may be selectively enabled.

12 Claims, 10 Drawing Sheets

| PGC #1 |
|---|
SINGLE PGC
FIG. 8A
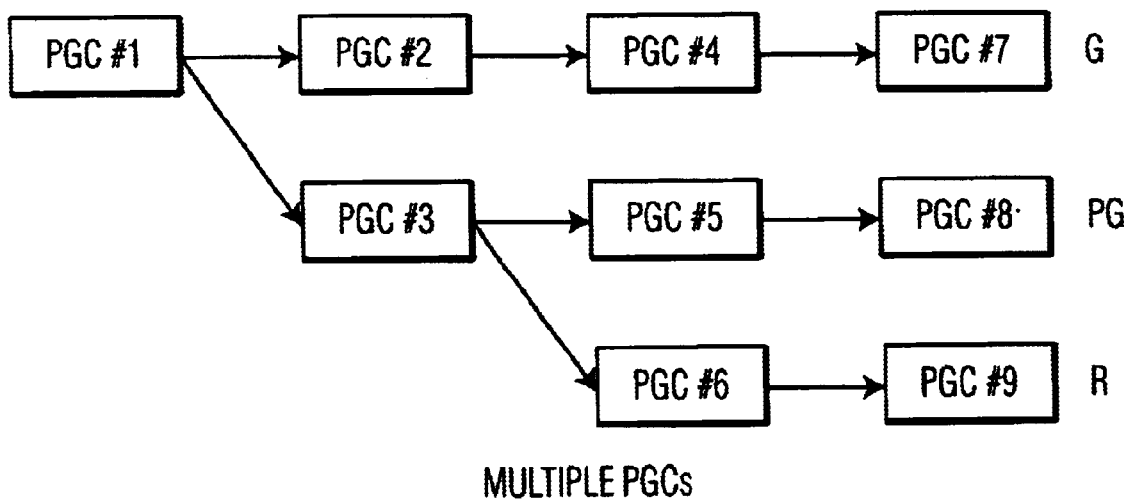
MULTIPLE PGCs
FIG. 8B
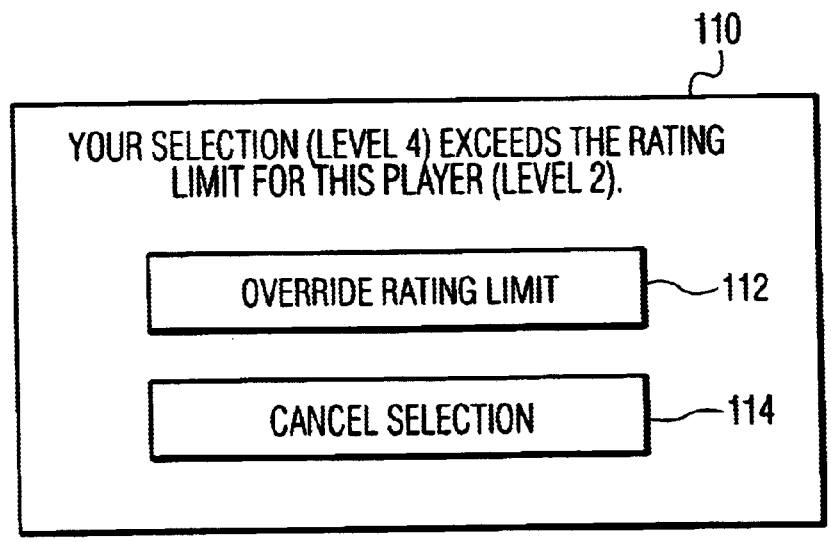
FIG. 9

METHOD AND APPARATUS FOR DYNAMICALLY OVERRIDING A RATINGS LIMIT DURING PLAYBACK OF A DIGITAL PROGRAM

This application claims the benefit of U.S. Provisional Application No. 60/093,356, filed Jul. 20, 1998.

The present invention relates to a user interface for a digital video apparatus, and in particular, a user interface for a digital video apparatus capable of selectively restricting playback of stored video and audio information in response to program related information, such as parental control ratings, included with the video and audio information.

Video signal processing systems that utilize storage media having digitally compressed video and audio information recorded thereon can give the user a vast number of options for controlling playback of a video title stored on such a media. One such system that is gaining rapid popularity comprises a video disc player adapted to process information stored in accordance with the digital video disc (DVD) specification. The information on a DVD formatted disc is recorded as discrete packets of data, in accordance with the applicable video and audio data compression standards, wherein designated packets carry data associated with various data streams, such as alternative video angles, audio tracks, subpicture streams, etc. A video disc player reading a DVD formatted disc may be controlled to display certain packets of data and skip over others. A single disc may be authored to allow playback of multiple camera angles, story endings, scenes according to a ratings content, etc. Using this capability, the DVD system can be used to prevent unauthorized access to information on a particular disc as well as seamlessly provide multiple variations of a video title in accordance with user commands.

One useful application of the restricted access and seamless branching feature of the DVD system relates to parental control of material that can be played from a designated disc player. Typically, a DVD player allows the user to select a parental control rating, usually varying from 1 to 8 wherein 1 is the least restrictive and 8 is the most restrictive. This user selected parental rating is used to automatically restrict the playback of discs, video titles on a disc, or scenes in a video title using that disc player. This user selected parental rating is used to automatically control the playback from that disc player based on the parental rating authored on the disc or video title. Such parental ratings generally correspond to the movie rating of the Motion Picture Association of America (MPAA).

During disc playback, the DVD player compares the user selected parental rating against the parental rating assigned to the disc or video title and only allows playback of the disc, video title or certain scenes from the video title if the user selected parental rating equals or exceeds the parental rating of the disc or video title. In the case of multiple playback sequences, the DVD player follows the playback sequence having a parental rating that corresponds to the user selected parental rating.

Ordinarily, the user must call up and navigate through the disc player's set up menu to select or change the user selected parental rating. Once selected, the user selected parental rating applies to all the discs played back using that disc player. If the user wishes to change the user selected parental rating, the user must stop playback of a disc, call up and navigate through the player set up menu by making the appropriate entries. If the user wishes to change the user selected parental rating frequently, the requirement to stop disc playback, and navigate the player set up menu can quickly become annoying. Therefore, it is desirable to allow the user to dynamically change the user selected parental rating during disc playback. The present invention recognizes that it is desirable to provide a user interface, method and apparatus which allows a user to dynamically change the user selected parental rating.

In accordance with the present invention a user interface, method and apparatus is provided for allowing a user to dynamically change a user selected parental rating. Advantageously, the present invention allows the user to dynamically change the user selected parental rating without calling up and navigating through the player set up menu. A further embodiment of the present invention allows the user to dynamically change the user selected parental rating only for a selected disc or video title set or portion of a program stored on a storage medium. In accordance with another aspect of the invention, the player automatically resets the user selected parental rating to the ratings level prior to the dynamic override after playback of the selected disc or video title set or portion of the program is complete.

The invention will be described with reference to the accompanying drawings, wherein.

Figure 10:
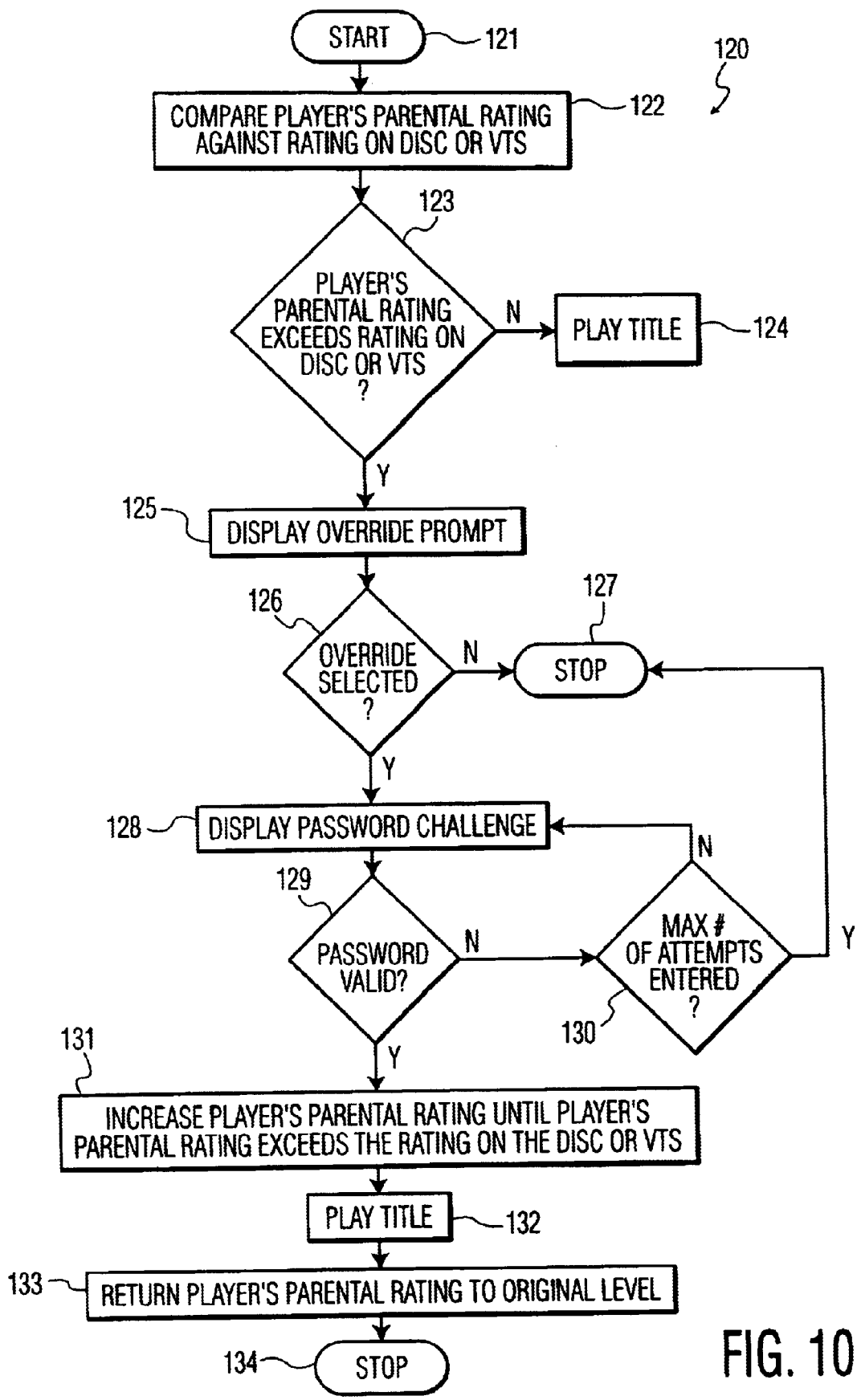
Figure 11:
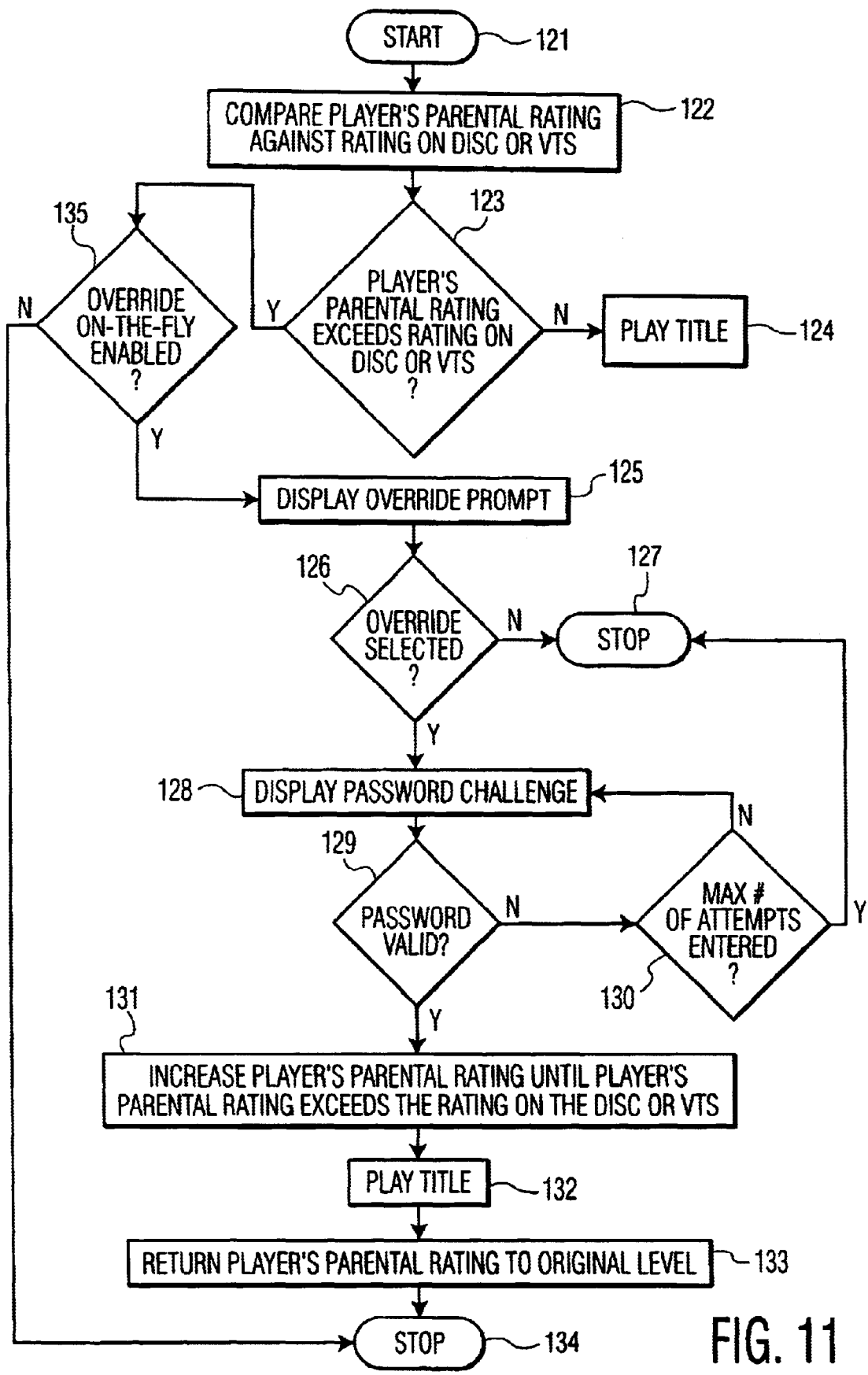

FIGS. 8 a–b are block diagrams illustrating sample playback options available in the DVD format;

FIG. 9 is an on screen display suitable for use with the dynamic parental control override feature of the present invention;

FIG. 10 is a flowchart illustrating the steps for implementing the dynamic parental control override feature of the present invention; and FIG. 11 is a flowchart illustrating steps for implementing another embodiment of the dynamic parental control override feature of the present invention.

Although the exemplary embodiment is described with reference to a digital video apparatus adapted to read compressed video and audio data from a disc and to process the data in accordance with the DVD specification, it is to be understood that the present invention may be used in any video processing apparatus capable of processing digital video and audio information, wherein program related information included with the video and audio information can be used to selectively restrict the playback of certain video and audio information on the disc.

Figure 1:
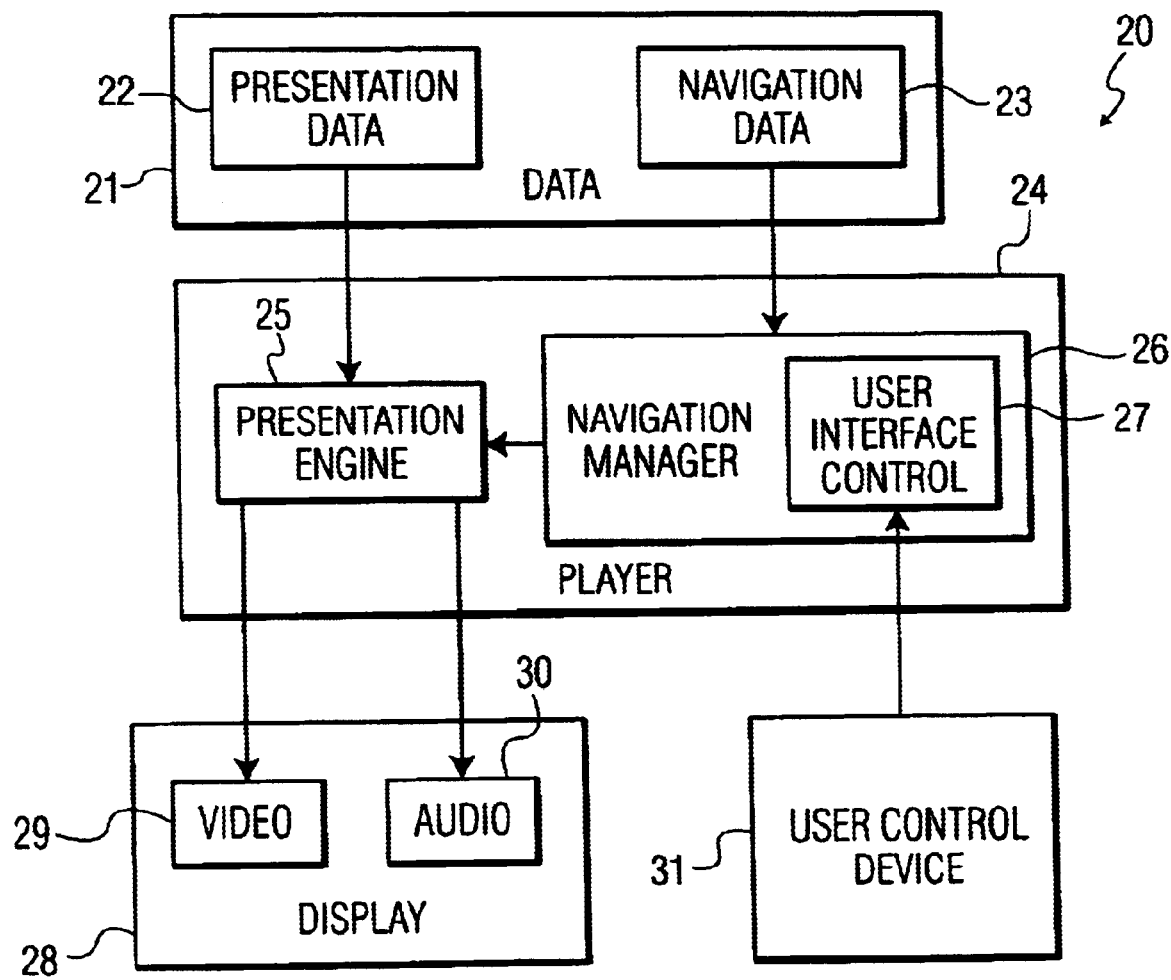
FIG. 1 is a block diagram of a video processing system in accordance with the DVD specification.

FIG. 1 is a block diagram of video processing system 20 in accordance with the DVD specification. In particular, FIG. 1 illustrates the basic relationship between presentation data and navigation data in video processing system 20 comprising disc player 24 and DVD formatted disc 21. The contents of disc 21 are read by disc player 24 and displayed on display 28 in accordance with commands from user control device 31. Disc 21 includes presentation data 22 and navigation data 23, wherein presentation data 22 comprises the data to be played back in the form of video, audio, subpictures, etc., and navigation data 23 comprises control data for determining how presentation data 22 is displayed. Disc 21 may also include data to generate a menu for allowing the user to interactively control the manner in which presentation data 22 is displayed.

Figure 2:
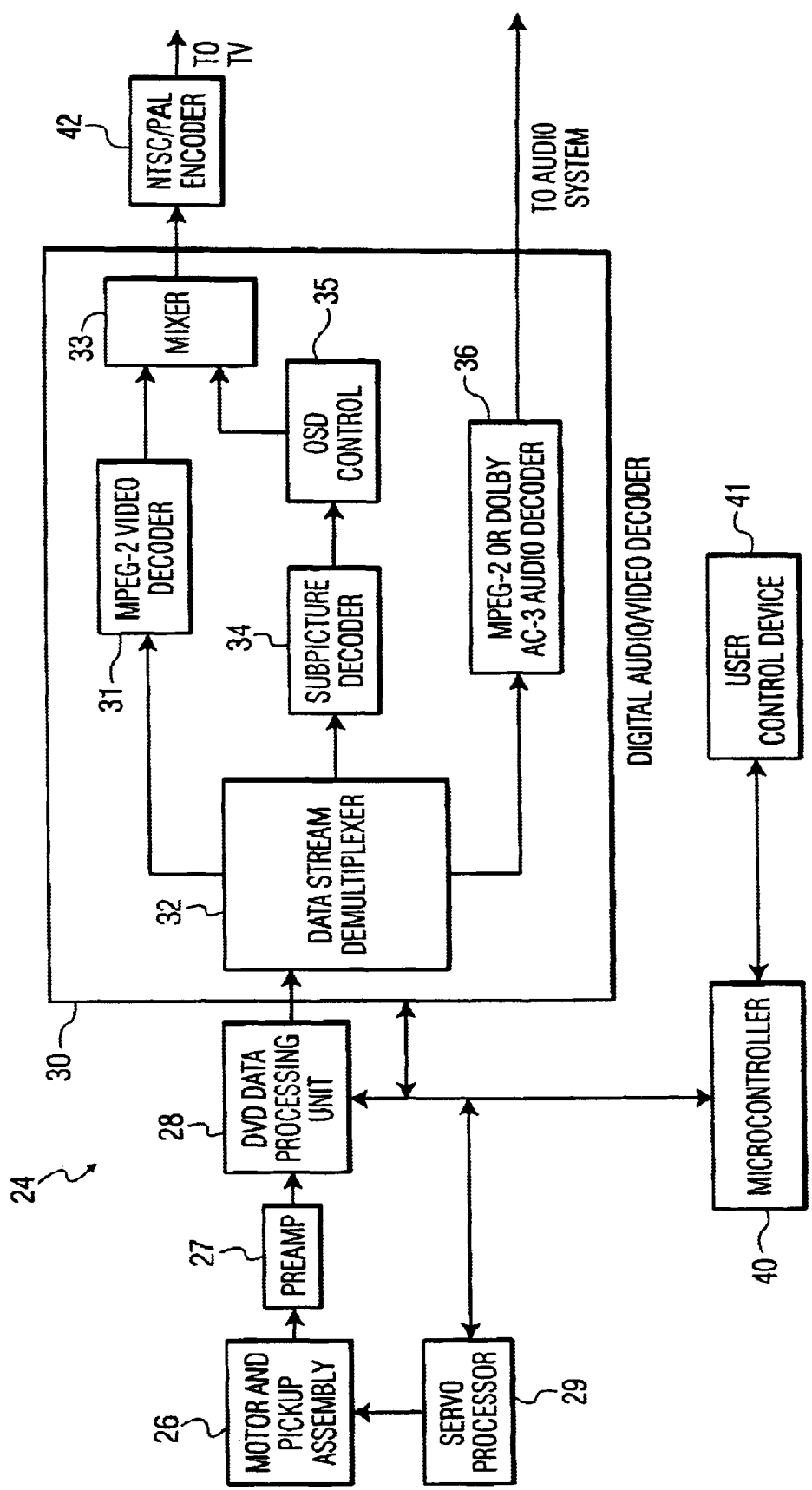
FIG. 2 is a block diagram of a digital video disc player suitable for implementing the dynamic parental override feature of the present invention.

Disc player 24 includes presentation engine 25 and navigation manager 26, which may be implemented in microcontroller 40 described with respect to FIG. 2. Presentation engine 25 receives presentation data 22, and under control of navigation manager 26, provides an output to display 28. Display 28 comprises audio output device 30 and video display 29. Navigation manager 26 includes user interface control 27 which provides a user interface, creates menus, etc. Navigation manager 26 uses information from navigation data 23 to control the output of presentation engine 25 to display 28. User control device 31 is coupled to navigation manager 26 and allows for user entry of data to control the manner in which navigation manager 26 controls presentation engine 25.

FIG. 2 is a block diagram showing the basic elements of an exemplary digital video disc player suitable for use in system 20 of FIG. 1 and for implementing the parental override feature of the present invention. The construction and operation of these elements are known to one of ordinary skill in the art and will not be discussed in detail here. Disc player 24 comprises motor and pickup assembly 26 which, under the control of servo processor 29, spins the disc and reads the information stored thereon. Preamp 27 and DVD data processing unit 28 translate the electrical pulses from motor and pickup assembly 26 into digital data that can be further processed by digital audio/video decoder unit 30. DVD data processing unit 28 typically performs functions such as demodulation, error correction and descrambling of the raw data read from the disc so that the data is in a suitable format for decoder unit 30.

Decoder unit 30 receives the demodulated, error corrected and descrambled data, processes the data, and provides the appropriate video and audio signals to a display unit, such as a television set. Decoder unit 30 comprises data stream demultiplexer 32 which demultiplexes the data from data processing unit 28 into a plurality of separate data streams, including a video stream, an audio stream and a subpicture stream, and provides the data streams to their respective data decoders. Video decoder 31 receives the video stream and provides a video signal to mixer 33. Subpicture decoder 34 receives the subpicture stream and provides data to on screen display (OSD) control 35 which provides OSD video signals to mixer 33. The combined video signal from mixer 33 is provided to NTSC/PAL encoder 42 which provides a video signal that conforms to the appropriate video signal standard to a video display device. Audio decoder 36 receives the audio streams from data stream demultiplexer 32 and provide the appropriate audio signals to an audio system.

Microcontroller 40 controls the operation of disc player 24. Microcontroller 40 is coupled to user control device 31, which may comprise IR remote control devices, front panel buttons or the like, and translates data from user control device 31 to control the operation of the various elements of disc player 24 described above. Typically, microcontroller 40 is also configured to control various access features of disc player 24 including, but not limited to, parental lock out, decryption of encrypted discs, and dialing remote service provider(s) (such as DIVX or other pay-per-view type service providers) to gain access to protected discs. Microcontroller 40 may be embodied in various forms, including, but not limited to, a dedicated integrated circuit, or a part of a decoder/controller unit.

Figure 3:
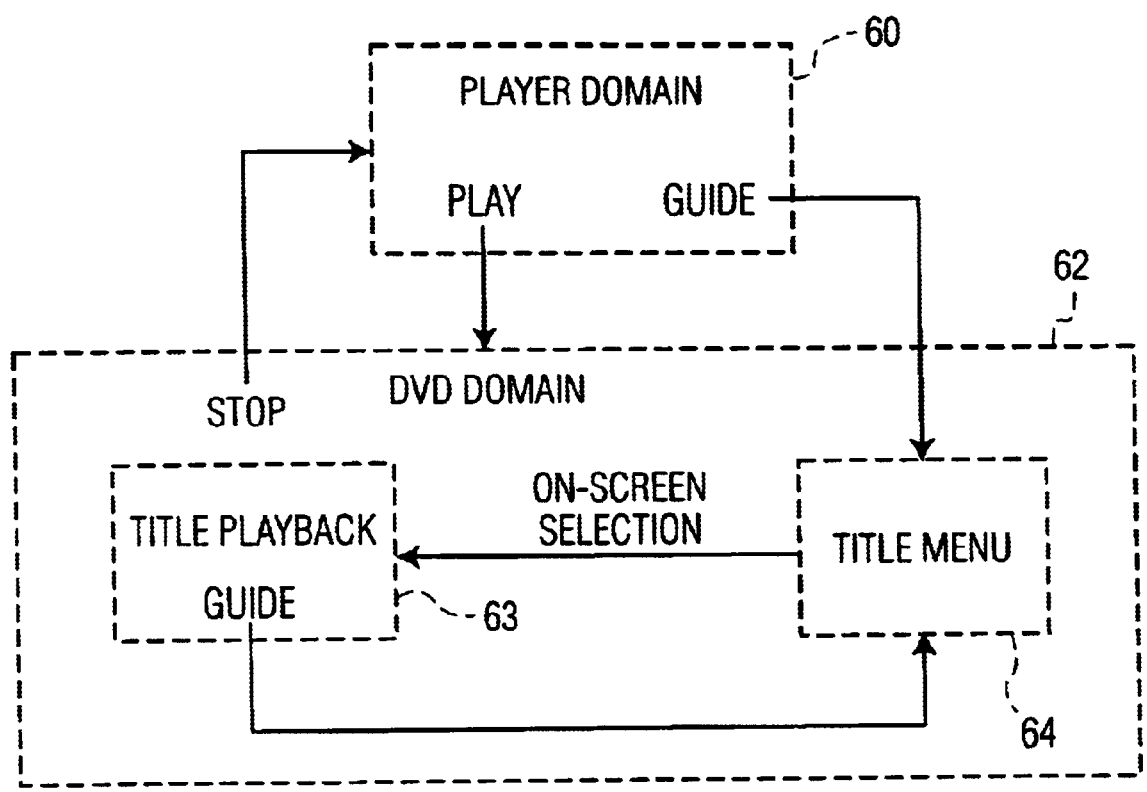
FIG. 3 is a block diagram illustrating navigation between the disc player domain and the DVD domain.

FIG. 3 illustrates the basic navigation scheme between the video player domain 60 and the disc domain 62. Entering a PLAY command or calling for guide data moves control to disc domain 62, wherein title playback proceeds as indicated by title playback block 63 or a title menu is displayed as indicated by title menu block 64. On screen selections made from the title menu controls the playback sequence. A STOP command returns the user to player domain 60.

Figure 4:
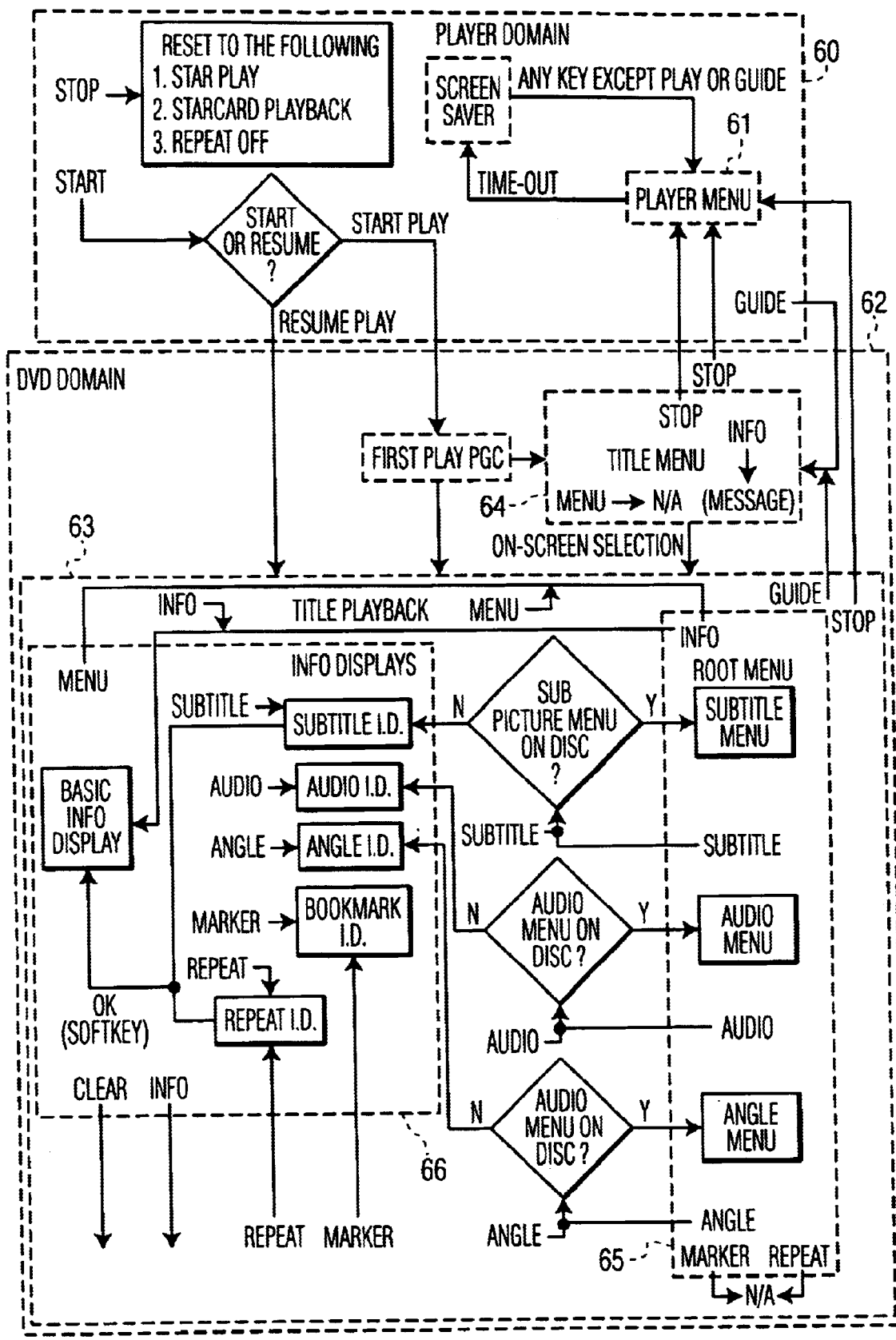
FIG. 4 is a detailed block diagram illustrating navigation between the disc player domain and the DVD domain.

A more detailed illustration of the navigation scheme between player domain 60 and disc domain 62 is shown in FIG. 4. As shown in FIG. 4, player domain 60 includes player menu 61 for allowing the user to select certain operating conditions for the player, for example parental control ratings. Also, DVD domain 62 includes title menu 64 for providing information about the respective video title. On screen selection from title menu 64 may transfer the user to title playback block 63 which includes provisions for root menu 65. Root menu 65 may be authored onto a disc to provide information about available options on the disc including, but not limited to, subtitles, audio tracks and camera angles.

Figure 5:
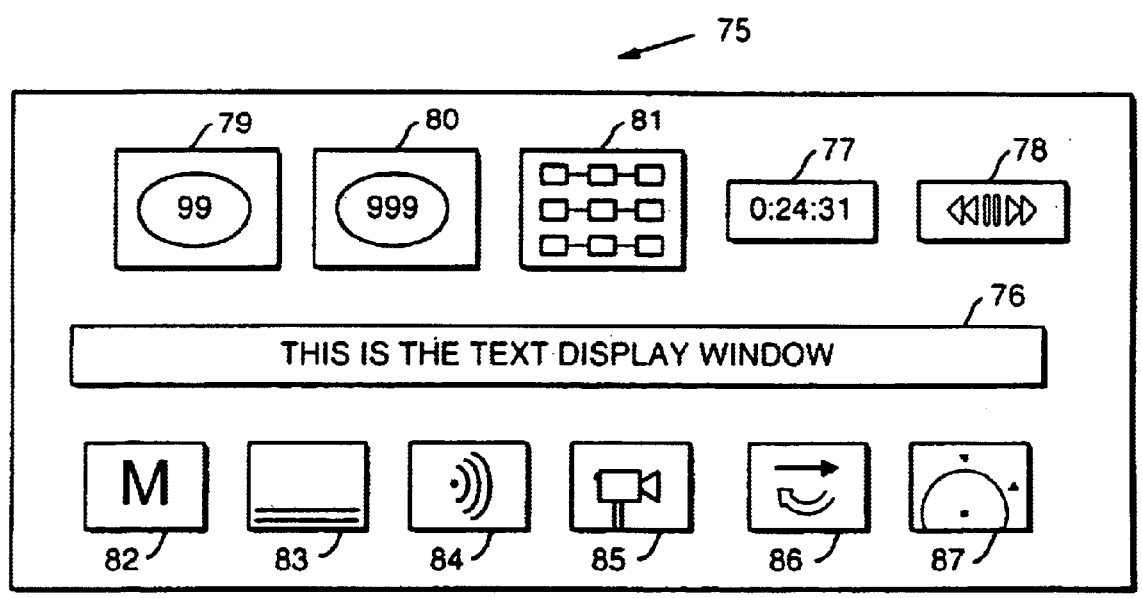
FIG. 5 is an example of an on screen information display that provides player and disc status information.

If the disc does not include a root menu 65 authored thereon, it is advantageous to include a provision for generating an informational display, developed from the actual video and audio information stored on the disc, which identifies and displays the available options to the user. Such a provision is indicated by information displays block 66. FIG. 5 illustrates an example of an informational display 75 that may be used for identifying and displaying the options available on the disc to the user when a root menu 65 is not available from DVD domain 62. Alternatively, disc player 24 may be configured to allow the user to select information display 75 rather than root menu 65 even if root menu 65 exists in DVD domain 62.

As shown in FIG. 5, information display 75 comprises text display portion 76 surrounded by a plurality of displays and buttons 77–87 for providing information about the contents of the disc and allowing the user to make various selections to control various aspects of the disc playback. Timer display 77 provides time information regarding the disc being played and transport display 78 shows the direction and speed of the disc drive. Button 79 provides access to information regarding the number of the current title. Button 80 provides access to information regarding the number of the current chapter. Button 81 allows the user to change the playmode setting of disc player 24. Button 82 allows the user to access the root menu of the disc. Button 83 provides access to information regarding subtitles on the disc. Button 84 allows the user to select from available audio streams. Button 85 allows the user to select from available camera angles. Button 86 allows the user to select from available repeat modes. Button 87 allows the user to set bookmarks and jump to a previously set bookmark.

Figure 6:
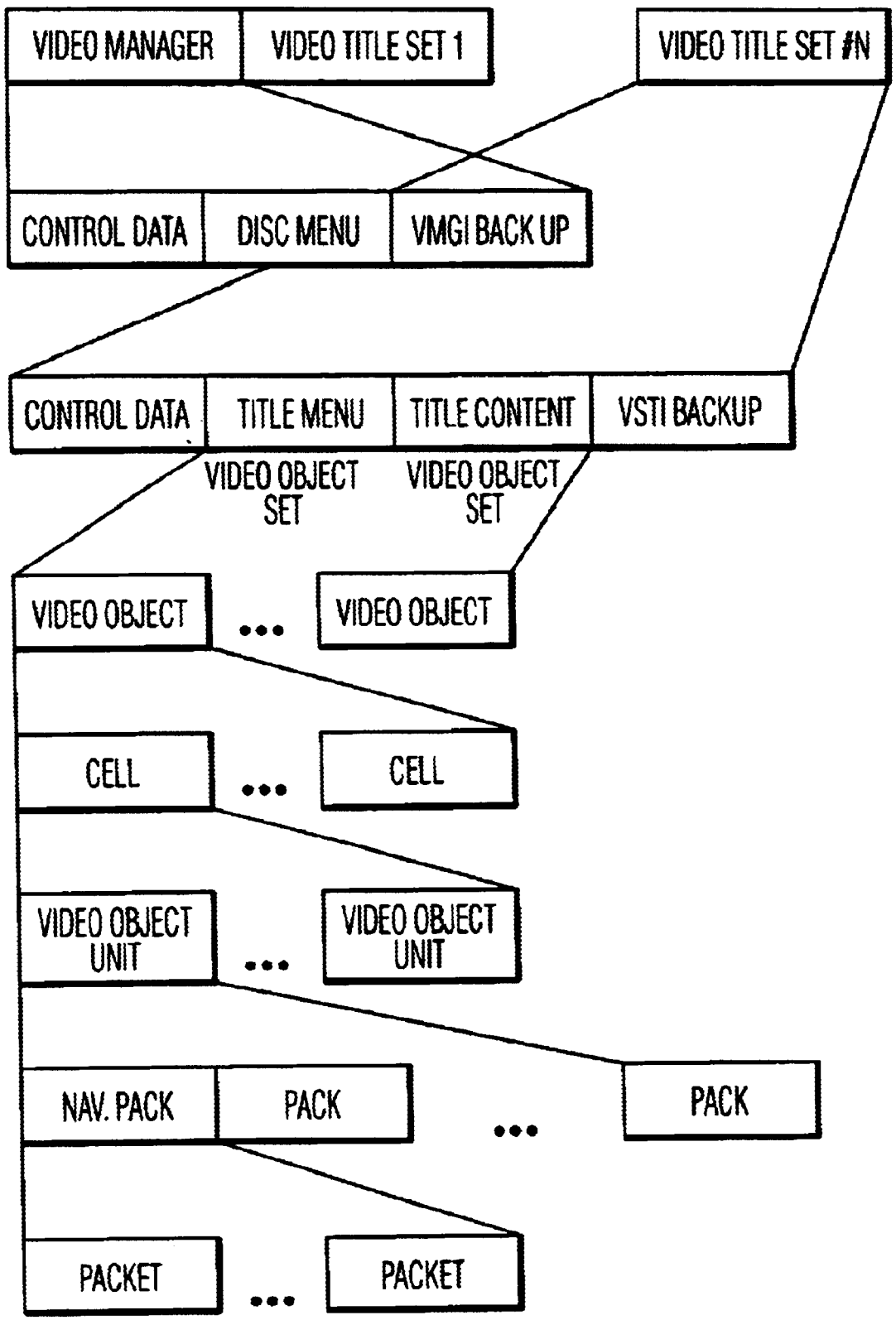
FIG. 6 is a diagram of a data structure in accordance with the DVD format.

FIG. 6 illustrates a data structure in accordance with the DVD specification and suitable for use in video processing system 20. The data structure is hierarchical, wherein each data block is divided up into component data blocks, which are further divided into smaller component data blocks. At the top of the hierarchy is a video manager block and one or more video title sets. The video manager includes a control data block having control information applicable to the disc and a disc menu. Each video title set corresponds to a designated program unit, for example, a movie or an episode of a television show.

Each video title set includes a control data block having control information applicable to the video title set, a title menu, followed by the title content, and a control data backup block. The title menu and the title content are each comprised of video object sets, wherein each video object set comprises a plurality of video objects. Each video object is comprised of a plurality of cells and each cell is in turn comprised of a plurality of video object units. Each video object unit is comprised of a navigation pack and a plurality of packs, which are subdivided into a plurality of packets. The smallest addressable block of data is a cell, wherein a cell may hold data for a portion of a program as short as a single scene or as long as an entire movie.

In implementing the parental control feature, a parental rating may be encoded to control access to the entire disc or may be encoded in the control data block of each respective video title set to control access to a particular video title set. If the parental control is encoded to control access to the disc, disc player 24 only allows appropriate playback of the disc when the user selected parental rating equals or exceeds the encoded parental rating. If the parent rating is encoded in the control data block of the video title set, disc player checks the parental rating of each video title set prior to playback of that video title set. The relationship of the present invention with regard to the encoded parental ratings is discussed further below.

Figure 7:
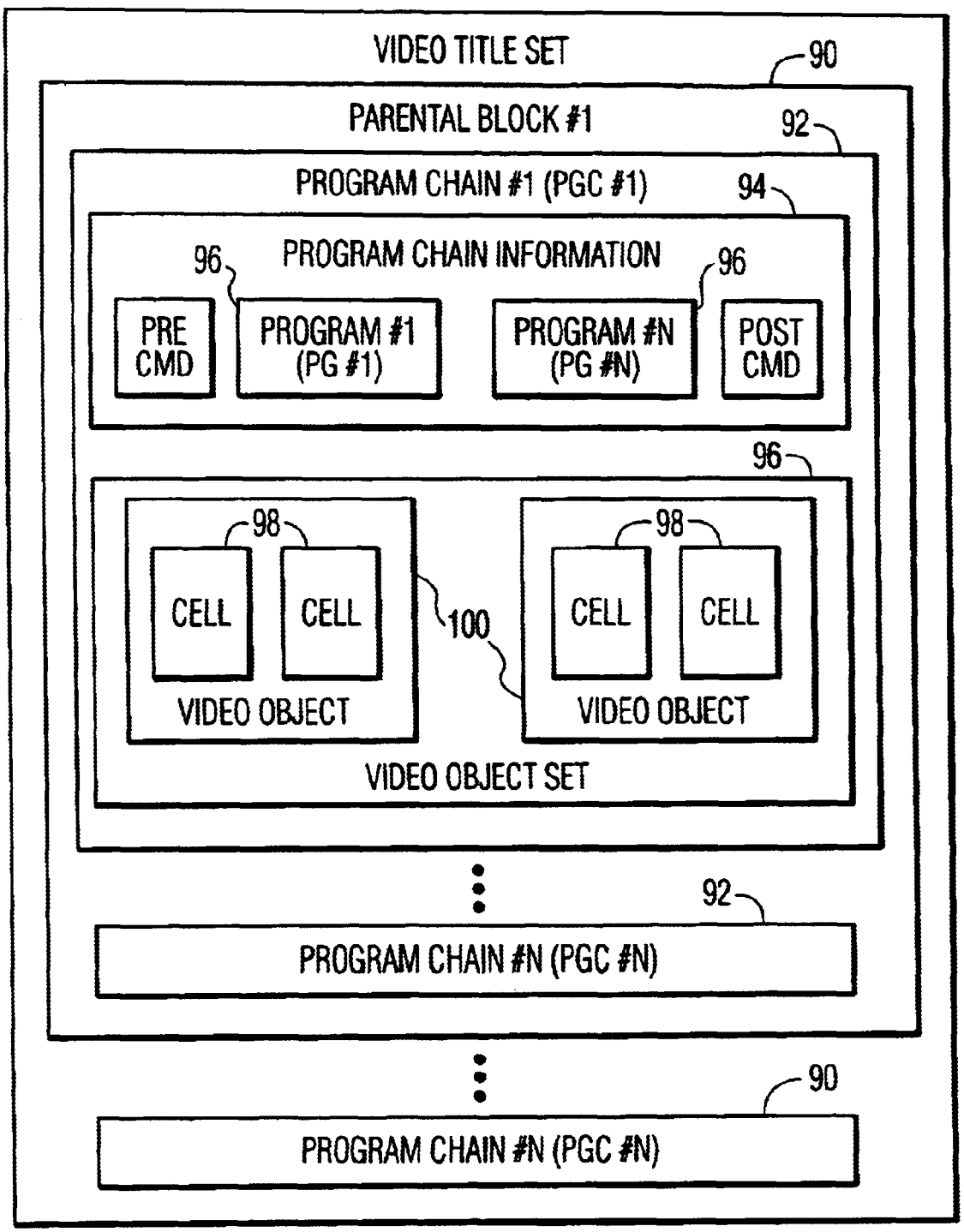
FIG. 7 is a block diagram of a presentation structure in accordance with the DVD format.

FIG. 7 illustrates a presentation structure in accordance with the DVD format and suitable for use in video processing system 20. The presentation structure is overlaid onto the data structure shown in FIG. 6. The presentation structure and the data structure intersect at the cell level. As shown in FIG. 7, each video title set may be comprised of a plurality of parental blocks 90, wherein each parental block is comprised of one or more program chains (PGCs) 92. Each program chain contains program chain information block 94 and video object set 96. Program chain information block 94 includes one or more programs (PGs) 96, each of which include a collection of pointers to cells 98 contained in respective video objects 100 in video object set 96. Programs 96 link cells 98 together and indicate the order in which they are to be played. Therefore, by providing the appropriate pointers to the desired cells, a program chain 92 provides a particular playback sequence and a collection of program chains 92 provide a playback sequence for the video title set. It can be seen that multiple parental blocks, each containing different program chains, may be created to generate multiple playback sequences corresponding to different parental control ratings.

Different versions of a video title set, corresponding to different parental control ratings, may be provided by the disc author to enable disc player 24 to seamlessly branch between various scenes to provide multiple playback sequences for a particular video title set. By setting the user selected parental rating to a low level, objectionable scenes may be skipped over for younger viewers, while an unedited version of the program may be viewed by older viewers by setting the user selected parental rating to a higher level. The seamless branching is achieved by linking and displaying the desired cells, programs and program chains as desired. FIGS. 8a–b illustrate a single playback sequence and a multiple playback sequence provided by seamlessly branching between groups of program chains. In FIG. 8a, the disc only provides for a single playback sequence which comprises program chain #1, wherein the playback proceeds in one continuous sequence. In FIG. 8b, multiple playback sequences are provided, wherein a G-rated sequence would follow program chains 1, 2, 4 and 7, while a PG-rated playback sequence would follow program chains 1, 3, 5 and 8, and an R-rated playback sequence would follow program chains 1, 3, 6 and 9.

As noted above, parental control can also be implemented by completely preventing access to a disc or to a video title set based on a parental rating encoded in the control data block of a video title set. In that case, disc player 24 compares the user selected parental rating against the encoded parental rating and determines whether playback of the disc or video title set is permitted. If the user selected parental rating equals or exceeds the parental rating of the disc or video title set, disc player 24 proceeds to playback the selected disc or video title set. If the user selected parental rating is below the parental rating of the disc or video title set, disc player 24 prevents playback of that disc or video title set.

As noted above, the present invention recognizes that an annoyance and inconvenience may be caused if a user is forced to stop playback of a disc, or video title set, and reset the user selected parental rating each time the user wants to view a disc or video title set having a parental rating that exceeds the user selected parental rating. If the user wishes to return the user selected parental rating to the original level after viewing the disc, or video title set, the user must repeat the selection procedure to change the user selected parental rating. It can be seen that having to repeat the procedure each time the user wishes to playback a disc or video title set having a parental rating higher than the user selected parental rating level can quickly become bothersome.

The present invention provides a user interface, method and apparatus for allowing a user to dynamically change the user selected parental rating so that the user is not forced perform the procedure detailed above. In the present invention, when a user enters a play command, disc player 24 compares the user selected parental rating with the parental rating encoded on the disc or video title set. If the user selected parental rating equals or exceeds the parental rating of the disc, or video title set playback of the disc, or the video title set, proceeds normally. However, if the user selected parental rating is less than the parental rating of the disc or video title set, disc player 24 automatically generates and displays an on screen display asking whether the user wishes to reset the user selected parental rating.

A suitable display for prompting such a user input is shown in FIG. 9. As shown in FIG. 9, display 110 indicates that the selection exceeds the parental rating limit for the player and asks the user to select button 112 to override the limit and to select button 114 to cancel the current selection. The selection and navigation between the two buttons may be performed using any conventionally known user interface methods, for example, using cursor control buttons and an ENTER button on a remote control. If the user selects button 112 to accept the override option, disc player 24 displays a password challenge. This password challenge may take many forms, including, but not limited to entering a numerical code selected by the user upon initial set up of disc player 24. When the user successfully passes the password challenge, disc player 24 automatically adjusts the user selected parental rating to a level sufficient to allow playback of the selected disc or video title set and then resumes playback of the selected disc or video title set. It is clear that this user interface may be implemented using techniques known to one of ordinary skill in the art, for example by programming microcontroller 40 to implement the steps detailed above.

A flowchart illustrating the steps for implementing the dynamic parental rating override feature of the present invention is shown in FIG. 10. In step 122, disc player 24 compares the user selected parental rating against the parental rating of the disc or video title set, in response to a PLAY command. If the user selected parental rating exceeds the parental rating of the disc or video title set, as determined in step 123, disc player 24 continues playback of the disc or video title set in step 124. If the user selected parental rating is below the parental rating of the disc or video title set, disc player 24 displays an on screen prompt in step 125, for example display 110, asking the user whether the user wants to override the parental rating limit.

If the user elects not to override the parental rating, the override routine stops. If the user elects to override the parental rating in step 126, disc player 24 displays a password challenge in step 127. If the user does not enter a valid password in step 129, disc player 24 goes to step 130 to determine whether the user has entered the maximum number of password attempts. If the user has entered the maximum number of password attempts, the override routine is stopped in step 127. If not, the user is given another opportunity to enter a correct password in step 128.

If the user enters the correct password in step 129, disc player 24 automatically increases the user selected parental rating until the user selected parental rating exceeds the parental rating of the disc or video title set in step 131. Then, disc player 24 plays back the disc or video title set as indicated in step 132. Following completion of the playback, which may be determined, for example, by the ejection of the disc or the playback being stopped for a predetermined period of time, disc player 24 automatically resets the user selected parental rating to the original rating level prior to the override in step 134. In this way, the user is able to dynamically override the user selected parental rating for a particular disc or video title set or particular portion of the information stored on the storage medium. However, modifications of the arrangement in FIG. 10 are possible. Specifically, step 133 could be optional. That is, in one embodiment or mode, the modified rating may be reset following playback as shown in step 133. In another mode or embodiment, the new rating setting established by the override operation may be maintained following completion of playback of the disc, title, program or portion of the information for which override was activated. Controlling the mode which establishes whether step 133 occurs or not can be accomplished by setting the desired mode during setup, e.g., using a remote control to select desired features from an on-screen display showing a menu of modes and options.

FIG. 11 shows, in flowchart form, another embodiment of a method for controlling a system in accordance with principles of the invention. Steps in FIG. 11 which have the same reference number as in FIG. 10 operate in a similar manner to the corresponding step in FIG. 10 as described above and will not be described again here. The arrangement depicted in FIG. 11 provides for selectively enabling the mode of operation in which user modification of rating limit during playback occurs, i.e., an override "on-the-fly" mode of operation. Specifically, FIG. 11 includes step 135 following step 123 which tests to determine if override on-the-fly is enabled. If so (a "YES" result at step 135), step 135 is followed by step 125 and override on-the-fly operation progresses as described with respect to FIG. 10. If override on-the-fly mode of operation is disabled (a "NO" result at step 135), then step 135 is followed by step 134 which exits the routine without providing the user an opportunity to override the system rating limit. Override of the rating limit could then occur prior to activation of the playback mode by navigating the usual setup menus as described above if a user desires.

Enabling/disabling of override on-the-fly mode may occur by selecting the desired mode on a setup option display created by the system's on-screen display processor during a setup mode of operation. The setup mode of operation, which enables controlling various features such as video processing characteristics, sound characteristics, closed captioning, etc., in addition to override on-the-fly mode enable/disable, may be activated, for example, by pushing a control button on a remote control.

It will be apparent to those skilled in the art that although the present invention has been described in terms of an exemplary embodiment, modifications and changes may be made to the disclosed embodiment without departing from the essence of the invention.

It is herein recognized that the parental control override feature may be implemented using any one of a number of conventionally known methods, or combination of methods, for controlling the operation of the various elements described in the disc player, for example by using embedded software in a microcontroller. Also, the present override feature may be implemented for any signal processing system which can be configured to selectively restrict access in response to parental control ratings, or other program related information, included with information stored on a storage medium such as stored audio, video and subpicture data stored, for example, using systems including video tape, DVD video systems, DVD audio systems, DVD-ROM systems, Laser Disc systems, etc. Therefore, it is to be understood that the present invention is intended to cover all modifications as would fall within the true scope and spirit of the present invention.

What is claimed is:

1. A method for controlling a system for processing information stored on a storage medium comprising the steps of:
   (A) providing a system set up menu for allowing a user to select a rating limit associated with the system in response to user input;
   (B) determining during a play mode of operation during which a program stored on the storage medium is being played back whether a portion of the program being played includes program information having a rating which differs from a first rating limit associated with the system;
   (C) providing to a user during the play mode of operation an opportunity to select whether to override the first rating limit, without using the system set up menu, responsive to determining that the rating of information included in the portion of the program differs from the first rating limit; and
   (D) changing the first rating limit to a second rating limit during play mode to permit play back of the portion of the program in response to the user selecting to override the first rating limit.

2. The method of claim 1 wherein step (D) is followed by the step of returning the second rating limit to the first rating limit upon completion of play back of the portion of the program.

3. The method of claim 2 wherein step (B) is preceded by the step of determining whether user modification of rating limit during play mode of operation is enabled.

4. The method of claim 3 wherein step (D) is preceded by the step of prompting a user to enter a password needed to enable overriding the rating limit.

5. The method of claim 4 wherein the step of determining whether user modification of rating limit during play mode is enabled is preceded by the step of determining whether the system is in a play mode of operation.

6. The method of claim 5 wherein the system comprises a DVD player and the storage medium comprises a DVD disc.

7. A method of controlling a system for processing information on a digital video disk comprising the steps of:
   (A) providing a set up menu for allowing a user to select a rating limit associated with the player in response to user input;
   (B) determining during a play mode of operation during which a program on the digital video disk is being played whether a portion of the program on the digital video disk includes program information having a rating which differs from a player rating limit selected by a user;
   (C) prompting a user during the play mode of operation to select, without using the set up menu, whether to override the player rating limit; and
   (D) overriding the player rating limit responsive to a user's request, without using the set up menu, to do so to establish a second rating limit during the portion of the program.

8. The method of claim 7 wherein step (D) is followed by the step of returning the second rating limit to the to the player rating limit upon completion of the portion of the program.

9. The method of claim 8 wherein step (B) is preceded by the step of determining whether user modification of rating limit during play mode of operation is enabled.

10. The method of claim 9 wherein step (D) is preceded by the step of prompting a user to enter a password needed to enable overriding the rating limit.

11. The method of claim 9 wherein the step of determining whether user modification of rating limit during play mode is enabled is preceded by the step of determining whether the system is in a play mode of operation.

12. Apparatus for processing information stored on a storage medium comprising:
   means for accessing information stored on the storage medium during a play mode of operation of the apparatus; and
   means for activating the play mode of operation, for processing the information accessed from the storage medium during the play mode of operation for determining whether a portion of the program being played includes program information having a rating which differs from a first rating limit associated with the apparatus, for providing to a user during the play mode of operation an opportunity to select, without using a system set up menu associated with the apparatus, whether to override the first rating limit responsive to determining that the rating of the portion of the program differs from the first rating limit, and for returning the rating limit of the apparatus to the first rating limit upon completion of play back of the portion of the program if the user selected to override the rating limit.

* * * * *